(12) United States Patent
Koller et al.

(10) Patent No.: US 8,428,916 B2
(45) Date of Patent: Apr. 23, 2013

(54) MODELING OF THE RADIATION BELT MEGNETOSPHERE IN DECISIONAL TIMEFRAMES

(75) Inventors: Josef Koller, Los Alamos, NM (US); Geoffrey D. Reeves, Los Alamos, NM (US); Reiner H. W. Friedel, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 366 days.

(21) Appl. No.: 12/390,611

(22) Filed: Feb. 23, 2009

(65) Prior Publication Data

US 2010/0088074 A1    Apr. 8, 2010

Related U.S. Application Data

(60) Provisional application No. 61/103,418, filed on Oct. 7, 2008.

(51) Int. Cl.
| | |
|---|---|
| *G06F 7/60* | (2006.01) |
| *G06F 17/10* | (2006.01) |
| *G06F 15/18* | (2006.01) |
| *G06E 1/00* | (2006.01) |
| *G06E 3/00* | (2006.01) |
| *G06G 7/00* | (2006.01) |
| *G06N 3/02* | (2006.01) |

(52) U.S. Cl.
USPC .................................. 703/2; 706/15; 706/26

(58) Field of Classification Search ........ 703/2; 706/26, 706/15; 434/277–282
See application file for complete search history.

(56) References Cited

U.S. PATENT DOCUMENTS

| | | | |
|---|---|---|---|
| 5,673,366 A | | 9/1997 | Maynard et al. |
| 2005/0267685 A1* | | 12/2005 | Intriligator et al. ................ 702/3 |
| 2008/0199077 A1* | | 8/2008 | Fowell ........................... 382/190 |

OTHER PUBLICATIONS

Green, Janet C. et al., "Relativistic Electrons in the Outer Radiation Belt: Differentiating Between Acceleration Mechanisms", Mar. 18, 2004, American Geophysical Union.*
Vassiliadis, Dimitris, "System Identification, Modeling, and Prediction for Space Weather Environments", Dec. 2000, IEEE.*
Koller, J. et al., "Identifying the Radiation Belt Source Region by Data Assimilation", Jun. 28, 2007, American Geophysical Union.*

(Continued)

*Primary Examiner* — Kamini S Shah
*Assistant Examiner* — Cedric D Johnson
(74) *Attorney, Agent, or Firm* — Husch Blackwell LLP; Samuel Digirolamo

(57) ABSTRACT

Systems and methods for calculating L* in the magnetosphere with essentially the same accuracy as with a physics based model at many times the speed by developing a surrogate trained to be a surrogate for the physics-based model. The trained model can then beneficially process input data falling within the training range of the surrogate model. The surrogate model can be a feedforward neural network and the physics-based model can be the TSK03 model. Operatively, the surrogate model can use parameters on which the physics-based model was based, and/or spatial data for the location where L* is to be calculated. Surrogate models should be provided for each of a plurality of pitch angles. Accordingly, a surrogate model having a closed drift shell can be used from the plurality of models. The feedforward neural network can have a plurality of input-layer units, there being at least one input-layer unit for each physics-based model parameter, a plurality of hidden layer units and at least one output unit for the value of L*.

13 Claims, 9 Drawing Sheets

OTHER PUBLICATIONS

McCollough, J.P. et al., "A Statistical Comparison of Commonly Used External Magnetic Field Models", Oct. 3, 2008, American Geophysical Union.*

Vacaresse, A. et al., "Dynamic Modeling of the High Energy Proton Belt", Mar. 1, 2000.*

Das, Saswato R., "Killer Electrons from Outer Space", Sep. 2007, http://spectrum.ieee.org/aerospace/astrophysics/killer-electrons-from-outer-space.*

Vampola, A.L., "Outer Zone Energetic Electron Environment Update", 1998, IEEE.*

Peter B. de Selding, DirecTV Trumpets HDTV Ambitions via Three-Satellite Order with Boeing, Space News Business, Apr. 30, 2007, retrieved from http://www.space.com/spacenews/archive04/directvarch_091304.html.

Douglas Pasternak, Lack of Intelligence: America's secret spy satellites are costing you billions, but they can't get off the launch pad, U.S. News & World Report, Aug. 3, 2003, retrieved from http://www.usnews.com/usnews/news/articles/030811/11nro_print.htm.

National Security Space Architect, Space Weather Architecture Study Final Report, Mar. 22, 1999.

LCDR Michael Weaver, William Murtagh, Christopher Balch, Doug Diesecker, Larry Combs, Misty Crown, Kent Doggett, Joseph Kunches, Howard Singer, Lt David Zezula, Halloween Space Weather Storms of 2003, NOAA Technical Memorandum OAR SEC-88, Jun. 2004, US Department of Commerce National Oceanic and Atmospheric Administration, Office of Oceanic and Atmospheric Research, Space Environment Center, Boulder, Colorado.

J. P. McCollough, J. L. Gannon, D. N. Baker, and M. Gehmeyr, A statistical comparison of commonly used external magnetic field models, Space Weather, Jun. 11, 2008, vol. 777.

Chia-Lin Huang, Harlan E. Spence, Howard J. Singer, and Nikolai A. Tsyganenko, A quantitative assessment of empirical magnetic field models at geosynchronous orbit during magnetic storms, Journal of Geophysical Research, Apr. 11, 2008, pp. A04208, vol. 113.

N. A. Tsyganenko, A model of the near magnetosphere with a dawn-dusk asymmetry, Journal of Geophysical Research, Aug. 13, 2002, pp. SMP 12-1-SMP 12-17, vol. 107, No. A8.

N. A. Tsyganenko, A Model of the Near Magnetosphere with a Dawn-Dusk Asymmetry, Journal of Geophysical Research, Aug. 13, 2002, pp. SMP 10-1-SMP 10-17, vol. 107, No. A8, 1176.

N. A. Tsyganenko and M. I. Sitnov, Modeling the dynamics of the inner magnetosphere during strong geomagnetic storms, Journal of Geophysical Research, Mar. 15, 2005, pp. A03208 2-16, vol. 110.

Raymond H. Myers and Douglas C. Montgomery, Response Surface Methodology Process and product optimization using designed experiments, 2004, pp. 1-85, 2nd ed., A Wiley-Interscience Publication, John Wiley & Sons, Inc.

Jack P. C. Kleijnen, Design and analysis of simulation experiments, 2008, pp. 1-71 and 138-157, Springer Science + Business Media, LLC, New York, NY.

Andrew R. Barron, Universal approximation bounds from superpositions of a sigmoidal function, IEEE Transactions on Information Theory, May 1993, pp. 930-945, vol. 39, No. 3.

G. Cybenko, Approximation by superpositions of a sigmoidal function, Mathematics of Control, Signals, and Systems, Feb. 17, 1989, pp. 303-314, vol. 2.

Russell D. Reed and Robert J. Marks, II, Neural Smithing Supervised learning in feedforward artificial neural networks, 1999, pp. 1-185, A Bradford Book, The MIT Press, Cambridge, MA.

P. Miller, pyMPI: Putting th py in MPI, 2008, retrieved from http://pympi.sourceforge.net/.

Stephen G. Nash, Newton-type minimization via the lanczos method, SIAM Journal Numer. Anal., Aug. 23, 1983, pp. 770-788, vol. 21, No. 4.

Pearu Peterson, f2py Fortran to Python Interface Generator, Jul. 13, 2007, pp. 1-17.

N. A. Tsyganenko, H. J. Singer, and J. C. Kasper, Storm-line distortion of the inner magnetosphere: How severe can it get?, Journal of Geophysical Research, 2003, pp. SMP 18-1-SMP 18-15, vol. 108, No. A5.

Marek Wojciechowski, Feed-forward neural network for python (ffnet), 2007, retrieved from http://ffnet.sourceforge.net/.

J. G. Roederer, Dynamics of geomagnetically trapped radiation, 1970, pp. 1-166, Springer-Verlag Berlin.

D. Boscher, S. Bourdarie, T. Guild, and Paul O'Brien, ONERA-DESP library, 2007, retrieved from http://craterre.onecert.fr/support/user guide.html.

Andrew R. Barron, Approximation and estimation bounds for artificial neural networks, Machine Learning, 1994, pp. 115-133, vol. 14.

Yue Chen, Geofreey D. Reeves, and Reiner H. W. Friedel, Then energization of relativistic electrons in the outer Van Allen radiation belt, Nature Physics, Jul. 1, 2007, pp. 614-617, vol. 3, Nature Publishing Group.

Y. Chen, R. H. Friedel, G. D. Reeves, T. E. Clayton, and R. Christensen, Multisatellite determination of the relativistic electron phase space density at geosynchronous orbit: An integrated investigation during geomagnetic storm times, Journal of Geophysical Research, Nov. 22, 2007, pp. A11214, vol. 112.

Janet C. Green and M. G. Kivelson, Relativistic electrons in the outer radiation belt: Differentiating between acceleration mechanisms, Journal of Geophysical Research, Mar. 18, 2004, pp. A03213, vol. 109.

Geofreey D. Reeves, Radiation belt storm probes: A new mission for space weather forecasting, Space Weather The International Journal of Research and Applications, Nov. 2, 2007, retrieved from http://www.agu.org/journals/sw/swa/feature/article/print.php?id+2007SW000341.

Frank Jansen, Risto Pirjola, and Rene Favre, Space Weather Hazard to the Earth?, 2000, pp. 1-40, Swiss Reinsurance Company, Zurich.

H. C. Koons and D. J. Gorney, A neural network model of the relativistic electron flux at geosynchronous orbit, Journal of Geophysical Research, Apr. 1, 1991, pp. 5549-5556, vol. 96, No. A4.

H. Lundstedt, Progress in space weather predictions and applications, Advances in Space Research, Sep. 12, 2003, pp. 2516-2523, vol. 36, Science Direct.

J.-G Wu, L. Eliasson, H. Lundstedt, A. Hilgers, L. Anderson, and O. Norberg, Space environment effects on geostationary spacecraft: analysis and prediction, Advances in Space Research, 2000, pp. 31-36, vol. 26, No. 1.

Dimitris Vassiliadis, Forecasting space weather, Space Weather—Physics and effects, 2007, pp. 403-425, Springer Praxis Books, Springer Berlin Heidelberg.

NASA, Artificial Satellites, World Book at NASA, retrieved from http://www.nasa.gov/worldbook/artificial_satellites_worldbook_prt.htm Dec. 21, 2009.

Los Alamos National Laboratory, Dream the Dynamic Environment Assimilation Model presentation slides Apr. 8, 2008.

* cited by examiner

MODELING OF THE RADIATION BELT MEGNETOSPHERE IN DECISIONAL TIMEFRAMES

RELATED APPLICATION

This application claims the benefit of U.S. Provisional Patent Application Ser. No. 61/103,418, filed Oct. 7, 2008, the disclosure of which is incorporated herein by reference.

STATEMENT REGARDING FEDERAL RIGHTS

This invention was made with government support under contract number DE-AC52-06NA25396 and cooperative agreement DE-FC26-04NT42113 awarded by the U.S. Department of Energy, and grant N00014-03-1-0652 awarded by the U.S. Office of Naval Research. The government has certain rights in the invention.

BACKGROUND OF THE INVENTION

The present invention relates to methods and systems for accelerating the computation of L* for magnetospheric research and applications. In particular, it relates to accelerating such calculations by using a neural network as a surrogate model for a physics-based model of calculating L*.

The atmosphere is defined by the air surrounding our planet, the magnetosphere is the area around our planet that is defined by the magnetic field of the Earth. FIG. 1 illustrates the pattern of the radiation belts around the Earth. The magnetosphere was discovered by artificial satellite activity, in particular by the activities of the artificial satellite Explorer 1 in 1958. For the remainder of the application the term satellite should be read to mean man-made artificial satellites, and not natural satellites, such as the moon, orbiting Earth.

The effect of the magnetosphere on satellites has been an important consideration in the design and operation of satellites. Satellites themselves are important for a wide range of activities including: defense, astronomy, biological experimentation, communications, navigation, reconnaissance, Earth observation, manned space activities (space stations), and weather observation. Today there are about 3,000 useful satellites in orbit.

For example, DirecTV has contracted with Boeing for the construction, launch and insurance of three HDTV communication satellites for $300 million per satellite. Clearly, the investments in these satellites are very serious economic investments for private enterprises. Public investment is much larger. According to U.S. News and World Report, the United States had invested over $200 billion in spy satellites as of 2003. The national security interests of the United States as of 1999 were summarized in a report by National Security Space Architect. (Ref. 4) (References referred to as "Ref. <number>")

A report by the reinsurance company, Swiss R E, *Space Weather: Hazard to the Earth?* reports that space weather is also believed to be a present risks to terrestrial electronics, space flight, aviation, telecommunications, electric power transmission, the oil and gas industry and railways. The damage done by a specific event is chronicled in *The Halloween Space Weather Storms of* 2003 by the National Oceanic and Atmospheric Administration (NOAA). (Ref. 5) Among the events chronicled by NOAA was the disabling of a $640 million dollar Japanese satellite to monitor climate change.

One major risk to the satellites is charged particles. The sun sends electrically charged particles (electrons and protons) to the Earth with a dynamic solar wind. The magnetic field in the solar wind will interact with the magnetic field of the Earth by reconnection of field lines which allows solar wind particles to enter the magnetosphere. Subsequently particles inside the magnetosphere are accelerated by wave-particle interactions creating the highly energetic radiation belts. Presently there are about 6,000 failed satellites FIG. 2 illustrates how these particles become trapped along a magnetic field line. The particle then follows a path near the magnetic field line, confined in a cylinder wrapped around that field line called a flux tube. When the flux tube leads the charged particles near the Earth they reach a mirror point. At that point the charged particle reflects, and travels along the flux tube until it reaches the mirror point at the other end of the magnetic field line.

These trapped electrically charged particles can harm satellites in a number of ways. For example:
1) protons (positive charges) can damage the solar panels that are used to power satellites;
2) electrons can get into computer chips and change programs and data; and
3) electrical charge can build up on the interior or exterior of the satellite, discharge like a small lightning bolt, and damage the satellite.

Satellites are designed with these risks in mind. However, the shielding material is typically very heavy. Therefore increasing the shielding also increases the cost of constructing, launching and deploying the satellite. While understanding the effect of the magnetosphere on these satellites is important, achieving that understanding is difficult. Also, because of the highly variable nature of space weather, it may be preferable to design the satellite to operate up to a threshold of magnetospheric disturbance, but plan to put the satellite in to a protected mode, such as by orienting the satellite or turning off the satellite, in order to preserve the satellite in weather conditions above the threshold of magnetospheric disturbance.

Space weather modeling, forecasts, and predictions require detailed information about the Earth's magnetic field. In radiation belt research many results depend on the magnetic field and the particle drift shells illustrated in FIGS. 1 and 2. One of the most important parameters is called L* which is the magnetic drift invariant, and is one of the three adiabatic invariants along with μ and K. L* is defined as:

$$L^* = \frac{2\pi\mu_0}{\Phi R_E}$$

Where $\mu_0$ is Earth's magnetic moment, $\Phi$ as the flux enclosed by the drift shell of a particle on a given field line as illustrated by FIGS. 2 and 9, and the Earth radius $R_E$. In a static dipole field, $\Phi$ can be calculated analytically whereas $\Phi$ requires detailed and time consuming numerical integration in a more realistic magnetic field.

The magnetic fields of Earth can be modeled at different levels of detail. For example, a very simple model is that of the Earth as simple magnet of unvarying magnetic field. More sophisticated models account for the shape of the magnetic field, and the location of magnetic field lines being dynamic and shaped by events such as changes in the solar wind.

Currently many empirical magnetic field models exist but it can take a long time to calculate L* using more sophisticated models. (Ref. 6) Where simple models from the 1970s or 1980s can perform a calculation in 3-6 minutes for one day's worth of data in one minute resolution, the models of the 1990s or 2000s take 1.5 to 4.5 hours, depending upon their sophistication. The performance of several different magnetic field models has been recently studied and found to be wanting. (Ref. 6)

Because of these long computing times, workers in the field often pick simplistic models over more accurate ones risking strong inaccuracies. (Ref. 6) Huang et al. quantified recently the effect of choosing a magnetic field model for radiation belt studies and concludes that the global inaccuracies of magnetic field models could alter the results of the inferred radial profiles of phase space densities of radiation belt electrons. (Ref. 7) Huang et al. also found that during quiet times the resulting values from the L□ calculation between models can vary by 13% and during storm times up to 50%. (private communications). The use of these simple models naturally results in either less accurate assumptions about the magnetospheric environment or calculations that cannot be used on practical time scales to make decisions informed by the magnetospheric environment.

Accordingly, there is a long-felt need for the ability to apply high-quality physics-based models of magnetospheric space weather on practical timescales. Rapid access to results from the best models would result in better research, better understanding of space weather, better design of satellites, and an improved ability to operate a satellite relative to magnetospheric conditions and its design.

(Ref. 4) United States Air Force Brigadier General Howard J. Mitchell in Space Weather Architecture Final Report (Mar. 22, 1999)

(Ref. 5) NOAA Technical Memorandum OAR SEC-88 (June 2004)

(Ref. 6) McCollough, J. P., J. L. Gannon, D. N. Baker, and M. Gehmeyr (Ref. 2008), A statistical comparison of commonly used external magnetic field models, Space Weather, 6, S10001, doi:10.1029/2008SW000391.

(Ref. 7) Huang, C.-L., H. E. Spence, H. J. Singer, and N. A. Tsyganenko (Ref. 2008), A quantitative assessment of empirical magnetic field models at geosynchronous orbit during magnetic storms, Journal of Geophysical Research (Space Physics), 113, 04, 208.

(Ref. 8) Tsyganenko, N. A. (Ref. 2002a), A model of the near magnetosphere with a dawn-dusk asymmetry 1. mathematical structure, Journal of Geophysical Research (Space Physics), 107, 1179.

(Ref. 9) Tsyganenko, N. A. (Ref. 2002b), A model of the near magnetosphere with a dawn-dusk asymmetry 2. parameterization and fitting to observations, Journal of Geophysical Research (Space Physics), 107, 1176.

(Ref. 10) Tsyganenko, N. A., and M. I. Sitnov (Ref. 2005), Modeling the dynamics of the inner magnetosphere during strong geomagnetic storms, Journal of Geophysical Research (Space Physics), 110, 03, 208.

(Ref. 11) Myers, R. H., and D. C. Montgomery (Ref. 2002), Response surface methodology process and product optimization using designed experiments, Wiley, New York; Chichester.

(Ref. 12) Kleijnen, J. P. C. (Ref. 2008), Design and analysis of simulation experiments, International series in operations research and management science, 111, Springer, New York.

(Ref. 13) Barron, A. (Ref 1991), Approximation bounds for superpositions of a sigmoidal function, Information Theory, IEEE Transactions on, pp. 85-85. Barron, A. (Ref. 1993), Universal approximation bounds for superpositions of a sigmoidal function, Information Theory, IEEE Transactions on, 39 (Ref. 3), 930-945. Barron, A. R. (Ref. 1994), Approximation and estimation bounds for artificial neural networks, Machine Learning, 14

(Ref. 14) Cybenko, G. (Ref. 1989), Approximation by superpositions of a sigmoidal function, Mathematics of control, signals, and systems, 2 (Ref. 4), 303.

(Ref. 15) Reed, R. D., and R. J. Marks (Ref. 1999), Neural smithing: supervised learning in feedforward artificial neural networks, The MIT Press, Cambridge, Mass.

(Ref. 16) Miller, P. (Ref. 2008), pympi: Putting the py in mpi, http://pympi.sourceforge.net/.

(Ref. 17) Nash, S. (Ref. 1984), Newton-type minimization via the lanczos method, SIAM Journal (Ref. 4) on Numerical Analysis, 21 (Ref 4), 770-788.

(Ref. 18) Peterson, P. (Ref 2007), F2py: Fortran to python interface generator.

(Ref. 19) Tsyganenko, N. A., H. J. Singer, and J. C. Kasper (Ref. 2003), Storm-time distortion of the inner magnetosphere: How severe can it get?, Journal of Geophysical Research (Space Physics), 108, 1209.

(Ref. 20) Wojciechowski, M. (Ref 2007), ffnet: Feed-forward neural network for python, http://ffnet.sourceforge.net/

(Ref. 21) J. G. Roederer "Dynamics of Geomagnetically Trapped Radiation", Springer Verlag, 1970

(Ref 22) Boscher, D., S. Bourdarie, P. O'Brien, and T. Guild (Ref. 2007), ONERA-DESP library v4.1, http://craterre.onecert.fr/support/user guide.html.

BRIEF SUMMARY OF THE INVENTION

A method of accelerating the calculation of L* in accordance with physics-based model of conditions in the magnetosphere can use a computer-based surrogate model comprising surrogate model computer instructions and surrogate model data trained to be a surrogate for the physics-based model of magnetic belts and processing the surrogate model computer instructions and surrogate model data with a computer processor to calculate L*. Operatively, the computerized method can be a feedforward neural network that uses, for example TSK03 (Ref. 8, 9, 10) as its physics-based model. The method can also use means for providing a surrogate model comprising surrogate model computer instructions and surrogate model data trained to be a surrogate for the physics-based model of magnetic field; and means for processing the surrogate model computer instructions and surrogate model data with a computer processor to calculate L*.

Generally, the physics-based model will use a plurality of physics-based model parameters and the method of calculation will use data for those parameters. The method also uses spatial data representing the spatial location for the location where L* is to be calculated. Operatively, the inventive method of calculating L* can use surrogate models for the physics-based model for each of a plurality of pitch angles, and selects from the plurality of surrogate models at least one surrogate model set of data and instructions that calculates a closed drift shell for the physics-based model parameters and the spatial coordinates to use in calculating L*.

One embodiment of the novel method uses a surrogate model with a first plurality of input-layer units, there being at least one input-layer unit for each physics-based model parameter; a second plurality of hidden layer units; at least one output unit for the value of L*; a third plurality of first communication avenues, each first communication avenue connecting one of first plurality of input-layer units to one of the second plurality of hidden layer units, each communication avenue having a weighting value that represents the weight that the respective individual hidden layer unit gives to the respective input-layer unit; and a fourth plurality of second communication avenues, each second communication avenue connecting one of second plurality of hidden layer units to the output unit, each second communication avenue having a weighting value that represents the weight that the output unit gives to the respective hidden layer unit.

Such a surrogate model can calculate L* by providing data values to each of the first plurality of input-layer units. Those values can be used to generate for each of second plurality of hidden layer units, the values associated with each of the hidden-layer units being determined by the weights that the respective hidden layer unit gives to each of the input-layer units that it is connected to by a communication avenue. Thereafter, a value of L* can be generated from the values generated for the second plurality of hidden layer units, the value of L* being determined by the weights that the output layer unit gives to each of the hidden-layer units that it is connected to by a communication line.

The method for calculating L* using a surrogate model can be used to predict the magnetospheric environment for a different location and for future times. The particle flux measured by a spacecraft at time T1 and the L* value from the surrogate model can be used to convert the geographic coordinates into adiabatic coordinates and calculate the phase space density. That phase space density together with a radiation belt model can then be combined with a data assimilation method to calculate the phase space density condition globally at a future time T2. The phase space density at this future time T2 can then be converted back to flux units using the L* surrogate model. The flux forecast for T2 can then be used for decision making and operating a satellite during adverse space weather conditions.

The present invention also contemplates a system for accelerated calculation of L* for a physics-based model of conditions in the magnetosphere. As before, the physics-based model of the magnetosphere having a plurality of physics-based model parameters for the calculation of L*. The system can have a first computer-readable medium containing computer instructions embodying a surrogate model for calculating L* from the physics-based model parameters and a computer-readable medium containing data values for the physics-based model parameters, which may be the first computer-readable medium or a second computer-readable medium. The system has a processor, operably connected to the computer-readable medium, capable of executing the computer instructions on the data values and a memory, operably connected to the processor, capable of containing the computer instructions and the data values.

The system can have particular computer instructions embodying a surrogate model. These instructions can include a first plurality of input-layer units, there being at least one input-layer unit for each physics-based model parameter; a second plurality of hidden layer units; at least one output unit for the value of L*. The system can also have a third plurality of first communication avenues, each first communication avenue connecting one of first plurality of input-layer units to one of the second plurality of hidden layer units, each communication avenue having a weighting value that represents the weight that the respective individual hidden layer unit gives to the respective input-layer unit, and a fourth plurality of second communication avenues, each second communication avenue connecting one of second plurality of hidden layer units to the output unit, each second communication avenue having a weighting value that represents the weight that the output unit gives to the respective hidden layer unit.

The system of claim can be adapted to predict the magnetospheric environment for a location. The computer readable media for such a system will have computer instructions and data for converting charge flux information into phase space density and computer instructions and data for converting phase space density into charge flux information. It can also have computer instructions and data for a radiation belt model; and computer instructions and data for a data assimilation method. In addition such a system can have computer instructions and data for operating satellites protections based on charge flux information generated by the radiation belt model and the data assimilation method.

The invention also relates to an article of manufacture, comprising a machine-accessible medium having instructions encoded thereon for accelerated calculation of L* for a physics-based model of conditions in the magnetosphere, the physics-based model of the magnetosphere having a plurality of physics-based model parameters for the calculation of L*. The instruction encoded can provide a surrogate model having surrogate model computer instructions and surrogate model data trained to be a surrogate for the physics-based model of magnetic belts.

Other features and advantages of the present invention will be apparent to those skilled in the art from the following detailed description, the accompanying drawings and the appended claims.

DETAILED DESCRIPTION OF THE INVENTION

Figure 1:
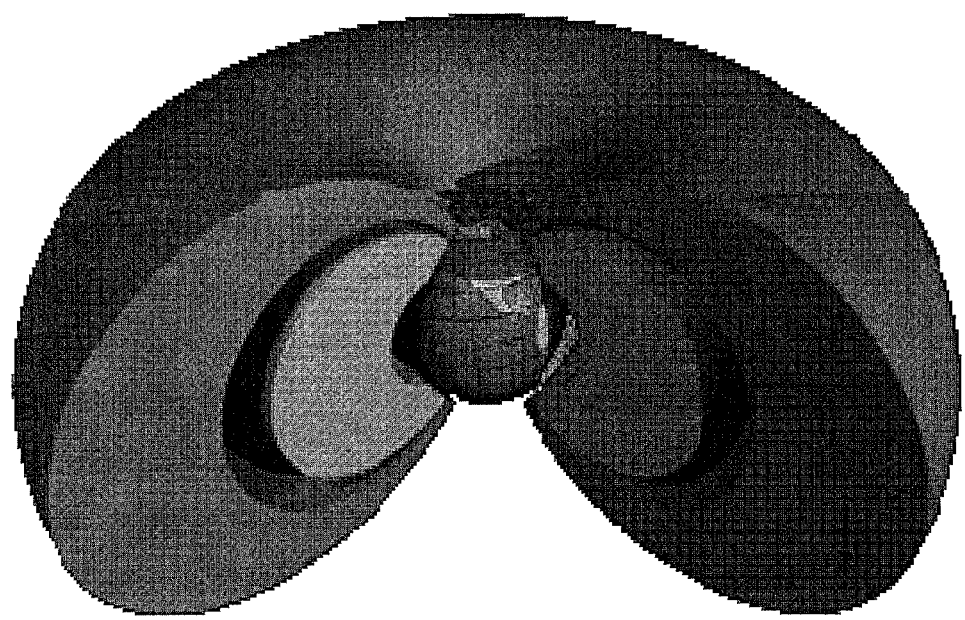
FIG. 1 is a cross-section of a simplified view of the magnetosphere.
Figure 2:
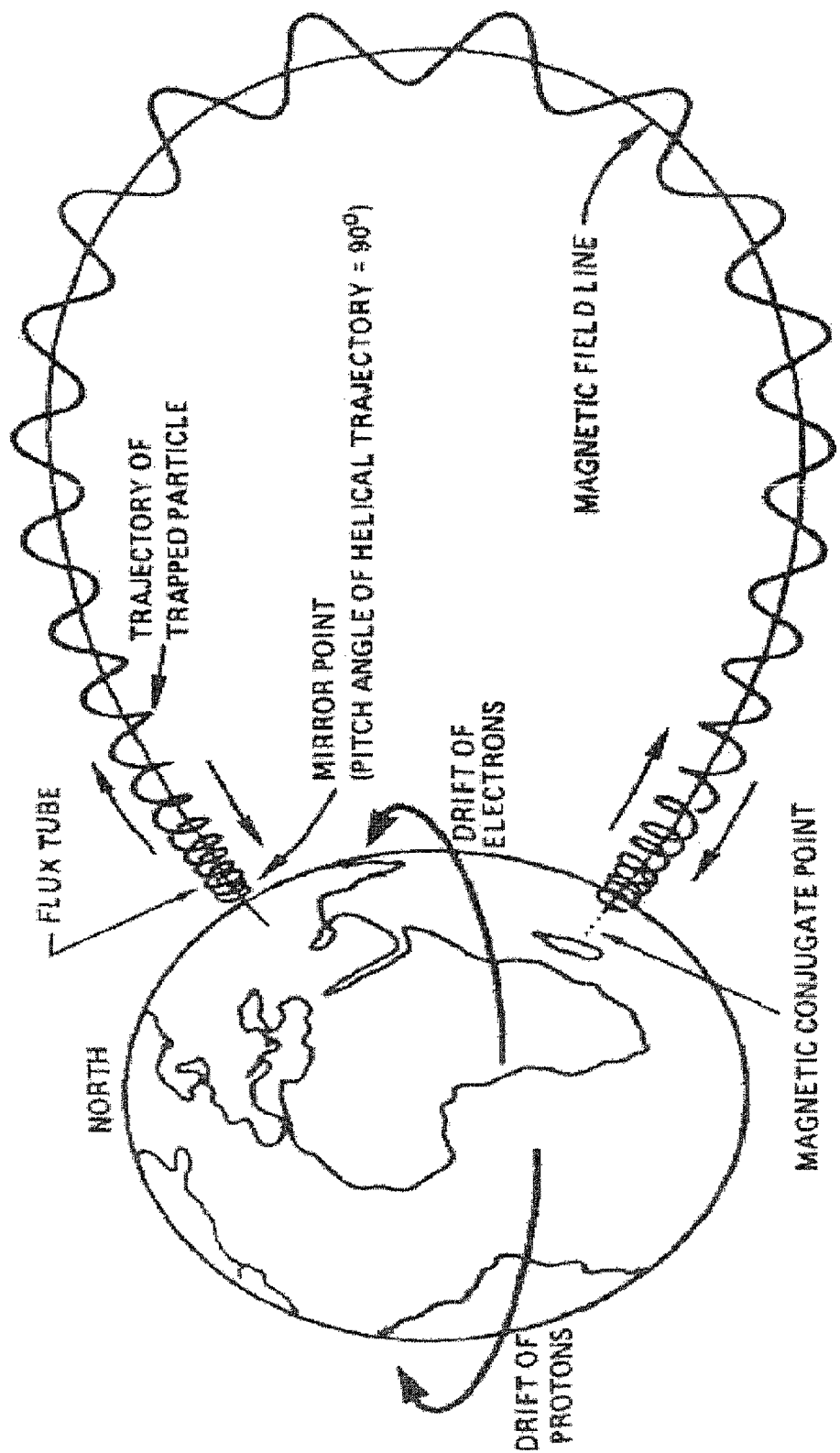
FIG. 2 is an illustration of the relationship of a single flux line to the Earth.

Although the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be further understood that the title of this section of the specification, namely, "Detailed Description of the Invention" relates to a rule of the United States Patent and Trademark Office, and is not intended to, does not imply, nor should be inferred to limit the subject matter disclosed herein or the scope of the invention.

The present invention relates to a method of transforming the calculation of L* from one that uses a physics-based model that requires a plethora of small non-reusable steps, to one that uses a neural network as a surrogate model. With a trained neural network, a slow model can be replaced by the much faster surrogate model, a process also called metamodeling. The surrogate model has a one-time investment of much calculation to calibrate and validate the model, but then can be re-used at a speed millions of times faster than the use of advanced physics-based models to calculate L*. The neural network that has been trained on an extensive data set can obtain L* at a fraction of the time, provided that the query falls within the operation scope of the surrogate model.

To exemplify the invention a new method of calculating L* based on a recent magnetic field model is presented, and the magnetic field modeling being referred to as TSK03. (Ref. 8)(Ref. 9)(Ref. 10) The exemplification is based on a feedforward neural network that has been trained on TSK03 calculations for all occurring solar wind conditions during the year 2002. The exemplified neural network is shown as being trained with locations for geosynchronous orbit. However, the locations in the magnetosphere that this approach can be used on can be expanded, with adequate data, to all regions of the inner magnetosphere. This application exemplifies the invention through a TSK03 model that has been replaced by a much faster surrogate model.

Surrogate models are mathematical representations of an input-output relationship of some other, more detailed, model. They operate based on the principle that when certain values are entered, certain other values should result, but they accomplish this without performing the actual calculations of the model that the surrogate model is a surrogate for. Accordingly, surrogate models can evaluate inputs and render outputs at a fraction of the computational cost, computational cost being an amount of computer resources. Different methods can be used to create surrogate models: The simplest surrogate models are based on polynomial regression. Others are based on kriging, Gaussian process modeling, and neural networks. (Ref. 11)(Ref. 12)

As mentioned earlier, TSK03 is a physics-based model for calculating L*. That means that it performs physics calculations to turn the values that are entered as input into output values. In the case of a surrogate model for TSK03, the surrogate model does not contain details of the physical processes or geometries but only focuses on the input-output relationship. Certain numbers when input in certain ways, result in certain number outputs. Surrogate models can be used to estimate the model sensitivity to input parameters, model parameter calibrations to better match physical measurements, forward-propagate uncertainty through the model, etc. (Ref. 11)(Ref. 12) The results from such surrogate models are not exact but it has been found that for calculating L*, the exemplary surrogate model has results close to the physics-based model. Therefore calculations based on physics are transformed into calculations based on a correlation, albeit potentially a complicated one.

The present application demonstrates the use of a feedforward neural network to create a surrogate model for TSK03. While surrogate models are by definition fast, they necessarily do not represent the physics-based model exactly. The goal of a surrogate model is to replace the physics based model with a fast computing model that can deliver results that are sufficiently close to the physics-based model. In the presently exemplified case the neural network was trained to calculate L* within less than 1% compared to the actual TSK03 model. However, using the surrogate model L* transforms a calculation that can be done at one speed into one that can be done almost three million times faster for the TSK03 model. Thus, the accuracy of a state-of-the-art model is preserved, while permitting calculation enormously faster than the physics-based models of the 1990s and 2000s.

Artificial neural networks are computational constructs. Accordingly, the neural networks discussed in this application are computer-based models. Artificial neural network have been named such because when viewed at a high level they loosely relate to neurons in our nervous system in the sense that they represent a non-linear mapping from input to output signals. (Ref. 13) An artificial neural network of the type used for the present invention consists of a number of non-linear computer program modules, or units, that are interconnected.

The practical applications of the teachings of this invention require computers. One of the benefits of this invention is that calculations that were only practical on extremely expensive hardware with programs carefully tailored to run on parallel processors can now be run on conventional desktop computers such as those found commonly in offices, research facilities and homes.

The neural networks which describe surrogate models establish trainable value-generating relationships among nodes and communication lines. However, for the present purposes, human beings are unable to themselves conduct the operations required for the purposes of this invention. This invention does not contemplate practice of the invention by humans unaided by machines.

The algorithm is capable of being embodied in hardware or firmware, but more commonly will be implemented to run as computer program software on a general purpose computer comprising at least processing unit to execute program instructions and at least one memory to store those instructions as well as the data for the program or programs such as an operating system. The computer will usually have access to computer readable storage memory, such as, but not limited to, hard disks, as well as display and network connections by which it may communicate with users or other computers. However, computers useful for embodying and performing the invention are not limited to having the particular features mentioned here.

The surrogate model will usually be implemented with instructions being stored in electronic or magnetic form on a computer readable medium, such as a hard disk, compact disk (CD) or digital versatile disk (DVD), although the program and data may also come to a computer over a network connection (wired or wireless), such as the Internet without residing in local permanent storage. These instructions are adapted to instruct a computer processor to carry out particular functions. The input data, to be detailed hereafter can also be stored on or retrieved from the same type of media as the instructions, together or separately from them, and are likewise adapted to be utilized by a particular machine scheme for representing numbers. Likewise, the output of the models, the original data transformed by a computer processor into the useful results, can be stored or transmitted out inversely as the instructions are handled. When reference is made to instructions or data in this application, it is to be understood that such instructions are to be adapted for use in computer machinery. While this invention does not limit such machinery, it is understood by those of ordinary skill in the art that all such machines cannot necessarily interpret the same instructions correctly, and that particular expression of the instructions may be necessary for a particular machine.

The physics-based models discussed can be described in terms of physics equations of general form as often found in articles and textbooks. The computer implementations of these models are computer instruction representations of these idealized models, and accordingly may include various approximations or adaptations made to conform to the computer environment. Such adaptations are within the abilities of a person of ordinary skill in the art. The physics-based model that the surrogate model is trained and validated against uses the same type of equipment as the surrogate model.

Figure 3:
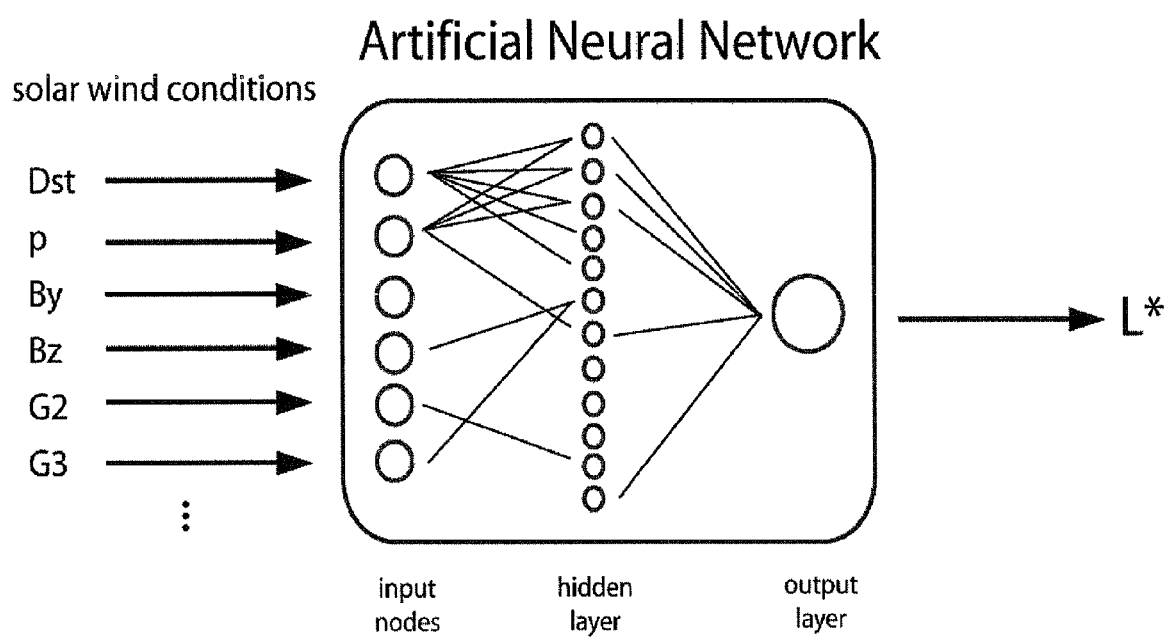
FIG. 3 is diagram of a simplified version of the neural network used for the present invention.

Neural networks are organized in a plurality of layers. Such a network is also called a multilayer perceptron. Referring to FIG. 3, the units, nodes or neurons (which are synonymous) are represented as circles. Also represented are connections, communication lines or avenues which are represented as lines. The units receive input signals from a number of other units and produce a single scalar output which then can be used as input to other units via weighted connections. Feed-forward networks do not allow connections from the output back to the input either directly or indirectly.

For a surrogate model, the neural network can have inputs that are the same as that of the model being meta-modeled. It can also have additional inputs. In the cases of a surrogate model for calculating L*, there will be a plurality of inputs. As is evident from Table 5 of (Ref. 10), the number of physical parameters varies depending on the physics-based model selected. The same would be true of models not mentioned in that table—they may have different parameters to describe the system. Referring to FIG. 3, the first layer provides a node for each input element.

In the case of embodiment of the present invention, the input layer has a first plurality of units. The input layer can have more nodes than the TSK03 model that being meta-modeled. In particular, the surrogate model being exemplified in this application has 16 nodes, one for each input parameter for the TSK03 model plus additional parameters that help to further specify the system. However, as better models become available, the general approach carried out for this exemplification can also be carried out on new models having new parameters. Input nodes are embodied as computer instructions to obtain data from some memory location, whether computer-readable or random access memory within the computer.

| Input Element Abbreviation | Input Element Description | TSK03? (Y/N) |
|---|---|---|
| 1 Year | Integer number representing the year | Y |
| 2 DOY | Integer number representing the day of the year | Y |
| 3 UT | Floating number representing time in units of [hours] | Y |
| 4 Kp | Kp index | N |
| 5 Dst | Dynamic storm time index in [nT] | Y |
| 6 n | Solar wind density [cm$^{-3}$] | N |
| 7 v | Solar wind velocity [km/s] | N |
| 8 p | Solar wind pressure [nPA] | Y |
| 9 By | Y component of the interplanetary magnetic field (IMF) in GSM coordinates in [nT] | Y |
| 10 Bz | Z component of the IMF field in GSM [nT] | Y |
| 11 G1 | G1 factor (Ref. 9) | N |
| 12 G2 | G2 factor (Ref. 9) | Y |
| 13 G3 | G3 factor (Ref. 19) | Y |
| 14 Lm | McIllwain L value (Ref. 21) | N |
| 15 MLT | Magnetic local time | N |
| 16 MLAT | Magnetic latitude | N |

Input elements 1-3 relate to the time that L* is being calculated for. Input elements 4-5 relate to indices created from magnetometer measurements, usually made on Earth. Input elements 6-9 relate to measurements from upstream satellites in space (some of which orbit Earth, and some of which are permanently positioned between Earth and the Sun) of the solar wind conditions. Input elements 11-13 are combinations of input elements 6-9 transformed via the cited time integration methods as indicated by the references. Input elements 14-16 are coordinates for the location for which L* is to be calculated which may be reported by the satellite itself, or external apparatus such as radar, triangulation of telemetry and the like or a predicted or desired location based on orbit or intended use.

Referring again to FIG. 3, the surrogate model also consists of a second plurality of hidden units. The number of neurons in the hidden layer is not fixed by the number of inputs, and can be determined through testing. The hidden layer of the present exemplification consists of 20 units, although the present invention encompasses fewer or more units as well. However, it is known that too many neurons in the hidden layer can cause the artificial neural network to simply memorize patterns. In such a case the network will not be able to perform with other data. A study has been done on how the error of a neural network output scales with the number of training samples and hidden nodes. (Ref. 13) It was found that the error decreases like $O(1/\sqrt{N})$ as the number of training samples N increases. The error also decreases as a function of the number of hidden nodes M like $O(1/M)$. In general the rule of thumb is that in order to reach a desired approximation error $\epsilon$, the following condition should hold true: $N > O(Mp/\epsilon)$ where p is the input dimension. In general, it has been shown (Ref. 14) that a sufficiently large network is able to approximate any function with arbitrary accuracy. (Ref. 15) These factors can guide the person of ordinary skill in the art.

Each hidden unit has its value determined by connections that it has to input units. Each hidden unit ascribes a weight to the values of the input units that it is connected to. These references to the input units are operatively computer instructions to reference the memory locations established by the computer instructions for the input nodes. Advantageously, each of the hidden units is attached to, or in communication with, each input unit. The second plurality of units can be connected to each input node and one output node to produce L* for a specified pitch angle. Accordingly, a plurality of surrogate models across a range of pitch angles is needed to meta-model for a wide range of pitch angles.

Similar to the real nervous system, artificial neural networks have to be trained by learning from examples. The training of a neural network transforms the computer data and instructions for the neural network from an initial state into a state which better mimics the physics-based model. Given a set of input parameters and desired outputs, algorithms like the popular "back propagation" algorithm can automatically adjust the weights of the interconnections to produce the outputs. If the training is successful, then new input can be provided to the neural network and a correct or at least reasonable output is obtained.

Because neural networks have such a redundant parallel structure, they have been shown to exhibit some fault tolerance. Many nodes draw information from a number of other nodes to produce one overall output. This makes the system relatively insensitive to minor damage, which is to say errors or suboptimal values in some of the data. The loss of some input degrades the system but does not necessarily lead to complete failure because the functions are distributed over several nodes instead of an isolated single location.

The property of how well a neural network can extrapolate to parameter domains (time, space, solar wind velocity, etc) that were not included the training data is called generalization. Function-approximating neural networks (like the ones here) have limited generalization properties. The distribution of training data and network complexity play an important role on the overall performance of the neural network. One problem is that a poor set of training data may contain misleading regularities. That problem is avoided by randomly selecting the training data.

The magnetic field model TSK03 accounts for contributions from the magnetotail current sheet, ring current, magnetopause current and Birkeland current. It also includes partial ring current with field-aligned closure currents which allows it to account for local time asymmetries of the inner magnetospheric field.

The present exemplification of the invention is based on the ONERA-DESP library V4.1 (Ref. 22) implementation of the magnetic field model TSK03 (option 10) which has no upper or lower limit on the input values. That version of the model, as well as earlier and later versions of the model, is available from http://craterre.onecert.fr/support/user_guide.html for download. The model uses the date, Dst, solar wind, pressure, y and z components of the IMF magnetic field, and two parameters G2 and G3 representing the time-integrated driving effect of the solar wind on the magnetosphere (Ref. 6).

The present exemplification of the invention used the f2py (Ref. 18) functionality of python to wrap the Fortran routines of the ONERA-DESP library and applied standard compiler optimization flags to increase the computing speed of the L* calculations by a factor of 2-3. The python module implementation of the ONERA-DESP library permits the writing of data processing routines and training the neural network without the usual overhead of other programming languages.

Figure 6:
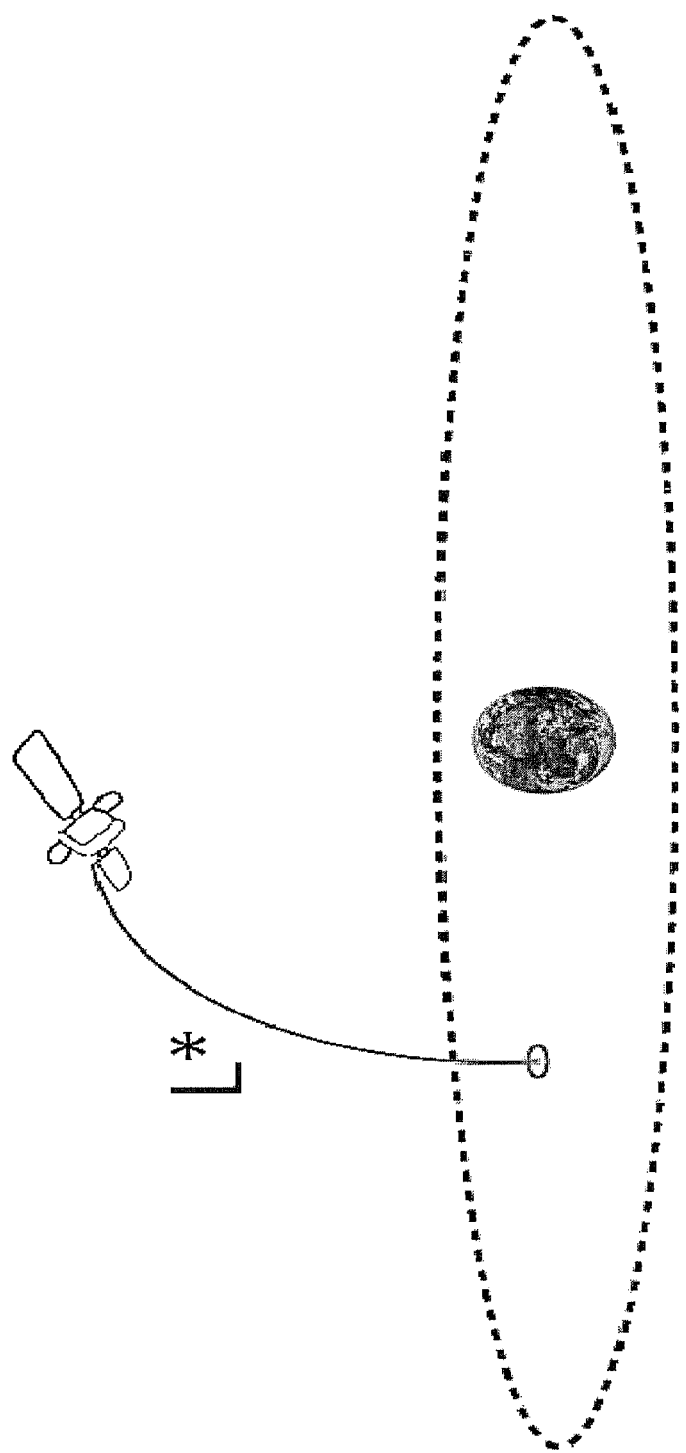
FIG. 6 illustrates the tracing of a field line to the magnetic equator for creating training data for the neural network.

In order to create the training data, an optimized algorithm was constructed to compute a large number of L* in a short period of time on a high performance cluster (HPC) at Los Alamos National Lab. The algorithm made use of the job scheduling facility LSF (Load Sharing Facility) via bproc (Clustermatic Beowulf Distributed Process Space). Since the usage of the HPC cluster constantly changes and usually only a few nodes are open to compute L*, instead of submitting one large parallel job, the L* calculations were broken down into smaller chunks submitted separately. Because each node consisted of two CPUs, additional parallelization of the jobs was accomplished with the python module pyMPI (Ref. 16). Overall these procedures resulted in the ability to compute half a million L* values within 45 hours on a high-performance cluster computer at Los Alamos National Lab. That was a factor of 40 faster than reported by (Ref. 6). However, the neural network of the present invention speeds up the computations even more. Referring to FIG. 6, it can be seen that the location of the satellite can be mapped to the equatorial plane. Such a step has to be repeated before validation and using the neural network as well but it can dramatically reduce the number of training samples by reducing the dimensionality of the system.

Figure 7:
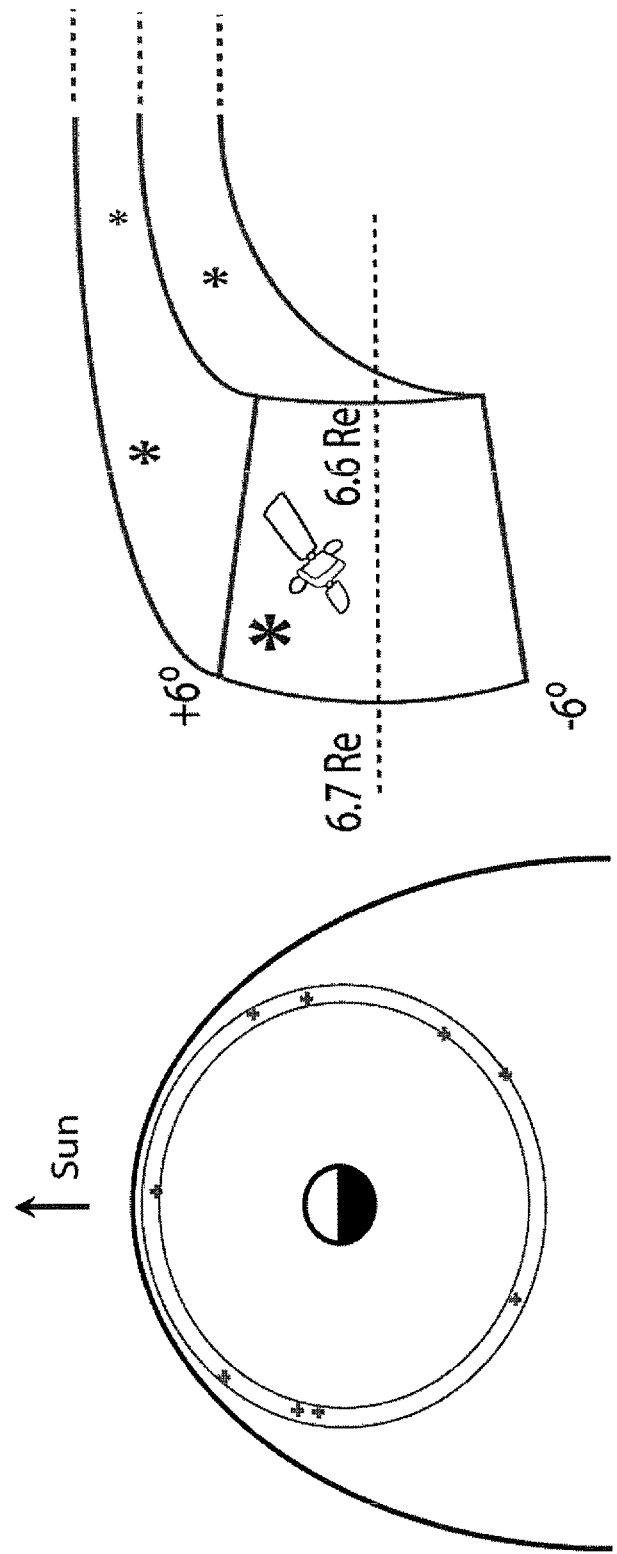
FIG. 7 shows the coordinate torus around geosynchronous orbit for the exemplified neural network.

The generalization performance of the neural network strongly depends on the input data and best results are obtained by randomly distributing the input data. For the example disclosed here the randomly distributed input was generated for a geosynchronous orbit and setup a coordinate torus with the following bounds: r=[6.6Re, 6.7Re], ☐=[−180 deg, +180], ☐=[−6 deg, +6 deg] in spherical geographic coordinates (FIG. 7). Ten locations were randomly selected inside this coordinate torus to calculate L* for every hour in the year 2002. That provided for 87,600 input patterns that were used to train the neural network.

The input data for Kp, Dst, solar wind density, pressure, velocity, y and z components of the IMF magnetic field were taken from the OMNI 2 data set provided by NASA's at http://omniweb.gsfc.nasa.gov. OMNI 2 (and to some degree of similarity, its predecessor OMNI) have solar wind data are from 15 geocentric spacecraft and from 3 spacecraft (ISEE 3, Wind, ACE) typically an hour (as the solar wind flows) upstream from the Earth. NASA spacecraft and US/DOD (Vela), ESA (HEOS 1 and 2) and Soviet (Prognoz 10) spacecraft are also included. A scheme selects which spacecraft's data would be used for what hours with data from multiple spacecraft. Data from the 3 upstream spacecraft are time-shifted at higher resolution (Ref. 1-5 min) to Earth and hourly averages then computed in "Earth time" for inclusion in OMNI.

The network was trained on solar wind conditions in the year 2002 (data from the OMNI period, incorporated in OMNI 2) because L* calculations were on hand for that time period, including this time period for several LANL-GEO spacecraft that could be used for validation.

Preferably, before the training of the network commences, all the bad-data values can be sorted out from the input data set and the target. That also includes all patterns that result in an open drift shell where L* is not defined. Hence, two separate sets of neural networks were used in the exemplary embodiment, one to detect if the requested location would be on a closed drift shell with L* defined (NN-1) and a second one that provides values for L* (NN-2).

Two options for creating the first neural network NN-1 are as follows:
  Option 1: Create a neural network for pattern recognition by using all input parameters and set the target to either 0 or 1 depending if the TSK03 model found an L* value or reported a bad data flag indicating an open drift shell.
  Option 2 (used by exemplified embodiment): Find the last closed drift shell value using a search algorithm by varying the radial coordinate at midnight local time. The last of the closed drift shell that TSK03 can find will be used as target for a feedforward neural network. The input will be the solar wind data and the target will be the corresponding last closed drift shell.

The second neural network NN-2 can be trained on the L* values provided by TSK03. The input vector patterns are as described above but include also magnetic coordinate locations magnetic longitude (MLT) and magnetic latitude (MLAT) and the McIllwain $L_m$. These additions increased the overall performance of the network. Because of the asymmetric stretching of the magnetic field in the midnight sector, the value for L* is a stronger function of the magnetic coordinate than the geographic coordinate. L* for 9 pitch angles between [10°, 90°] was also calculated.

Figure 8:
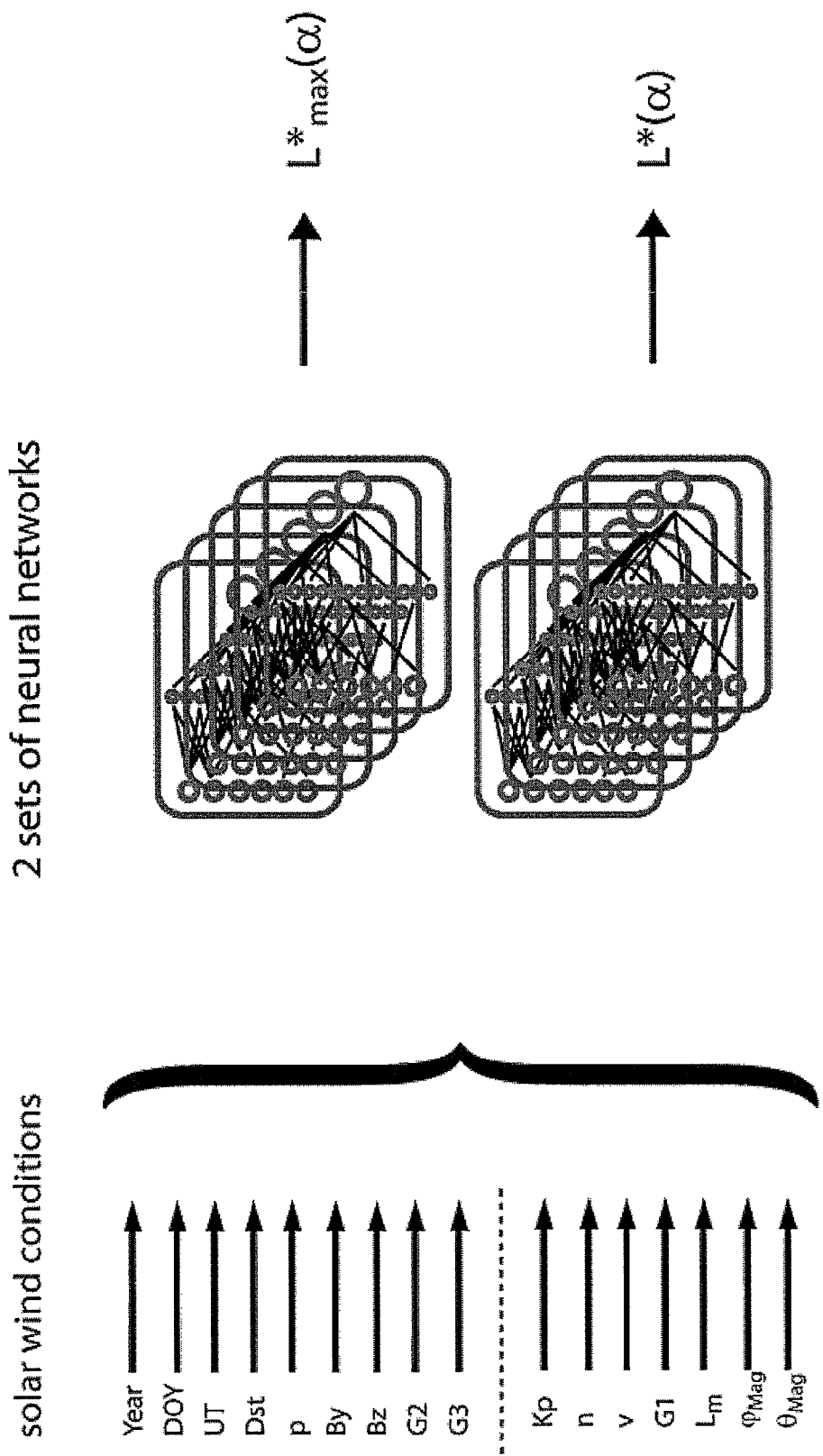
FIG. 8 illustrates that pitch angle requires a separate neural net.
Figure 9:
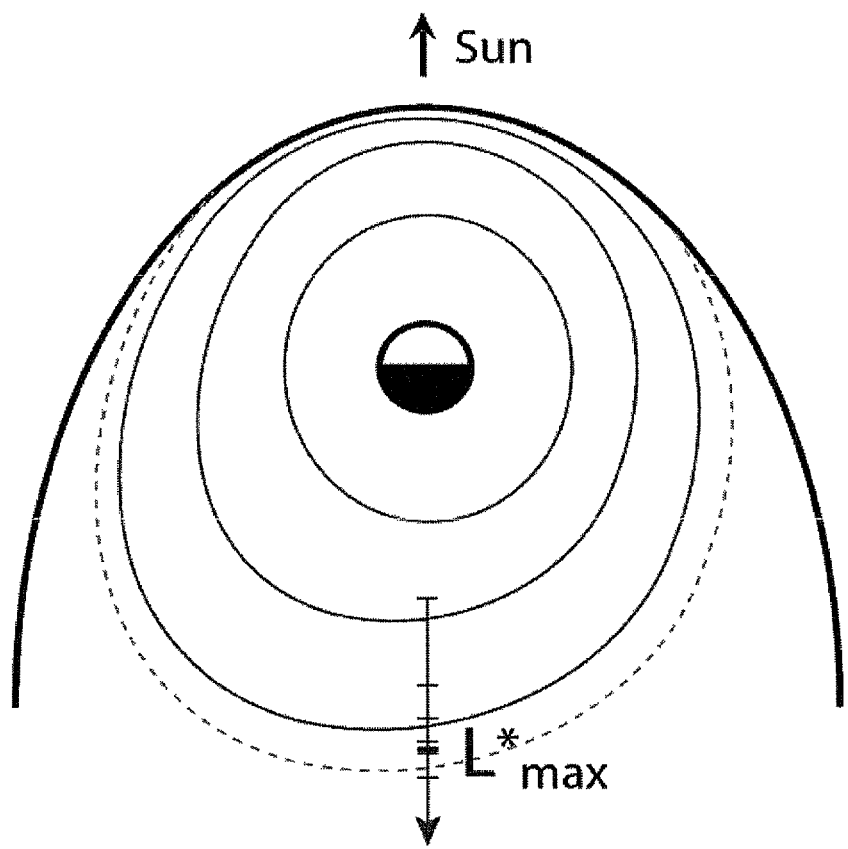
FIG. 9 illustrates the leapfrog method along the radial direction at midnight local time for finding L*max. The dashed line represents the last closed drift shell with L*max.

Referring to FIG. 8, each neural network also needs to be done for a plurality of pitch angles. The set of NN-1 surrogate models for each pitch angle determines the maximum L* that is allowed. The second set of NN-2 surrogate models for each pitch angle determines the actual L*. If L* is larger than Lmax then the system reports "not on a closed drift shell".

The python module ffnet (Ref. 20) was used to train the neural network in a 16/20/1 configuration. This notation represents 16 input parameters, 20 hidden nodes, and one output node for L*. A truncated Newton optimization algorithm (TNBC) provided in the ffnet package was used and the error tolerance was set to $10^{-5}$. Other optimization algorithms exist but of the approaches tried, the TNBC (Ref. 17) was the fastest to converge to a minimum.

The ffnet python module has a functionality that permits exporting the trained neural network into a FORTRAN subroutine that can be compiled separately. This is a major advantage over other neural network training packages because the trained neural network can be shared easily.

The results from NN-1 and NN-2 will depend on the pitch angle. Accordingly, it is necessary to create several neural networks for a range of pitch angles (FIG. 8). When requesting values for a certain pitch angle, one will have to interpolate between neural networks of neighboring pitch angles.

Validation is an important step to verify that a surrogate neural network model should be used for its purposes, whether they are for research, satellite design, satellite control, or other uses. In the exemplary embodiment being described here, validation was performed against out-of-training sample input. The standard deviation of the neural network output compared to the target values is $\Delta L^*=0.037$. See FIG. 4. This is much less than the error found by Huang et al. [2008] who compared magnetic field models and their predicted $L^*$. These results demonstrate that using the substitute model created by the neural network will not introduce a large additional error compared to the errors inherent in the physics-based TSK03 model. The total error is the sum of the squared error $\square^2=\square_1^2+\square_2^2$ However, the neural network can calculate $L^*$ at a fraction of the time. Half a million calculations can be done in only a few seconds as compared to running the TSK03 model in serial mode, where the results would have taken over 1700 hours. This translates into a speedup of over several million times.

Validation is an important step to verify that a surrogate neural network model should be used for its purposes, whether they are for research, satellite design, satellite control, or other uses. In the exemplary embodiment being described here, validation was performed against out-of-training sample input.

Similarly, the scope of use of a trained and validated model is best restricted to the scope of training and validation. Because the exemplary model was trained only with values inside the artificial geo-synchronous coordinate torus, it should be used for the geosynchronous region only. If the satellite location is far away from the locations where the model has been trained and validated, the results are expected to be of uncertain reliability because function-approximating neural networks have been known to have poor generalization performance.

We have trained the exemplary neural network against geosynchronous locations for solar wind conditions in 2002. We have also validated the exemplary neural network against several LANL-GEO spacecraft and the network performance is similar to all of them. We will present one instance of the validation here using LANL-01A. This LANL-01A data set has 25,919 values.

Figure 4:
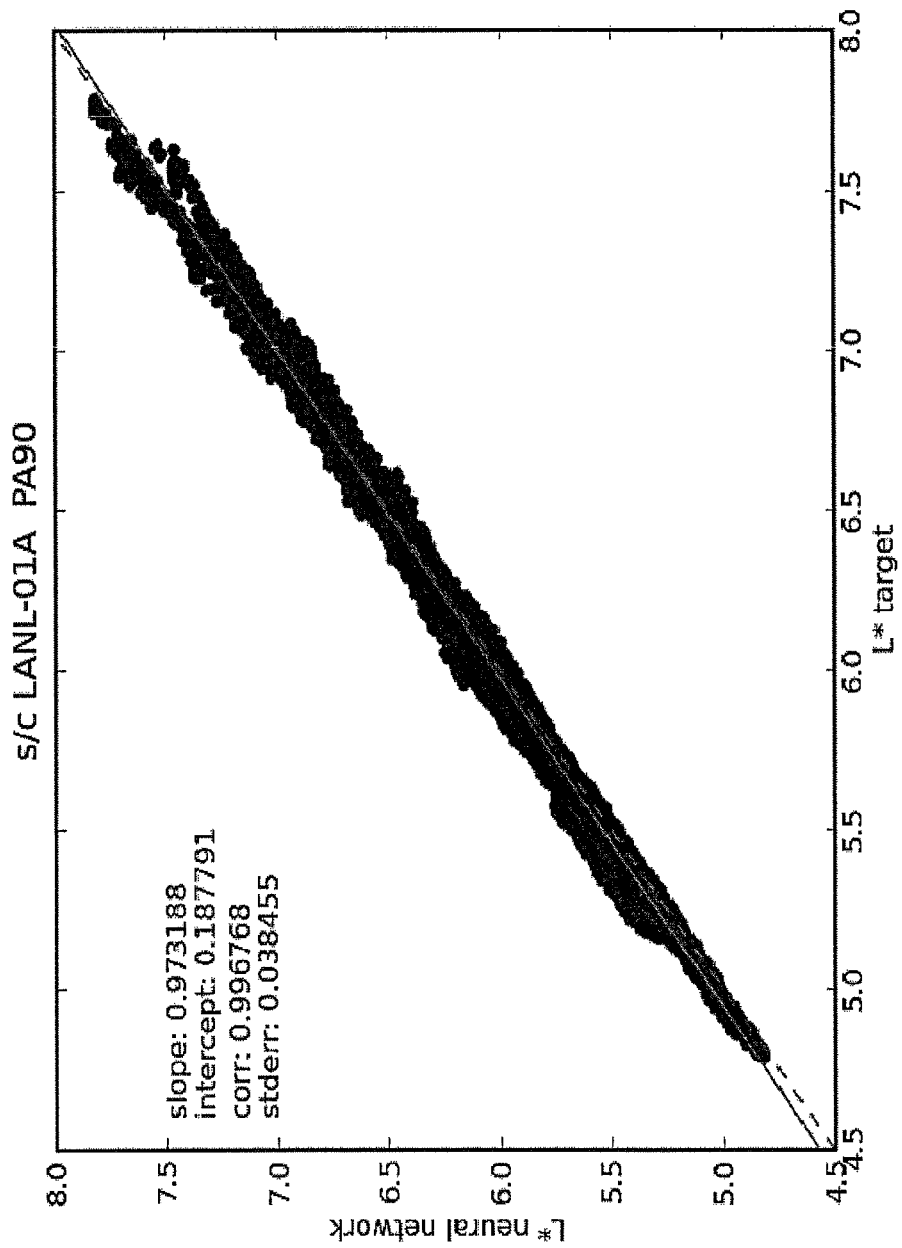
FIG. 4 is a scatter plot of the results of a the calculations of L* from a trained neural network on the y-axis against the values calculated by the full physics-based model from which the neural network is based on the x-axis

To show the quality of the validation, FIG. 4 is a scatter plot of the $L^*$ results from the LANL-01A data using neural network (y-axis) versus the $L^*$ results from the TSK03 model using the LANL-01A data. The $L^*$ values for both axes range from about 4 to about 9. A dotted line shows the line y=x.

Figure 5:
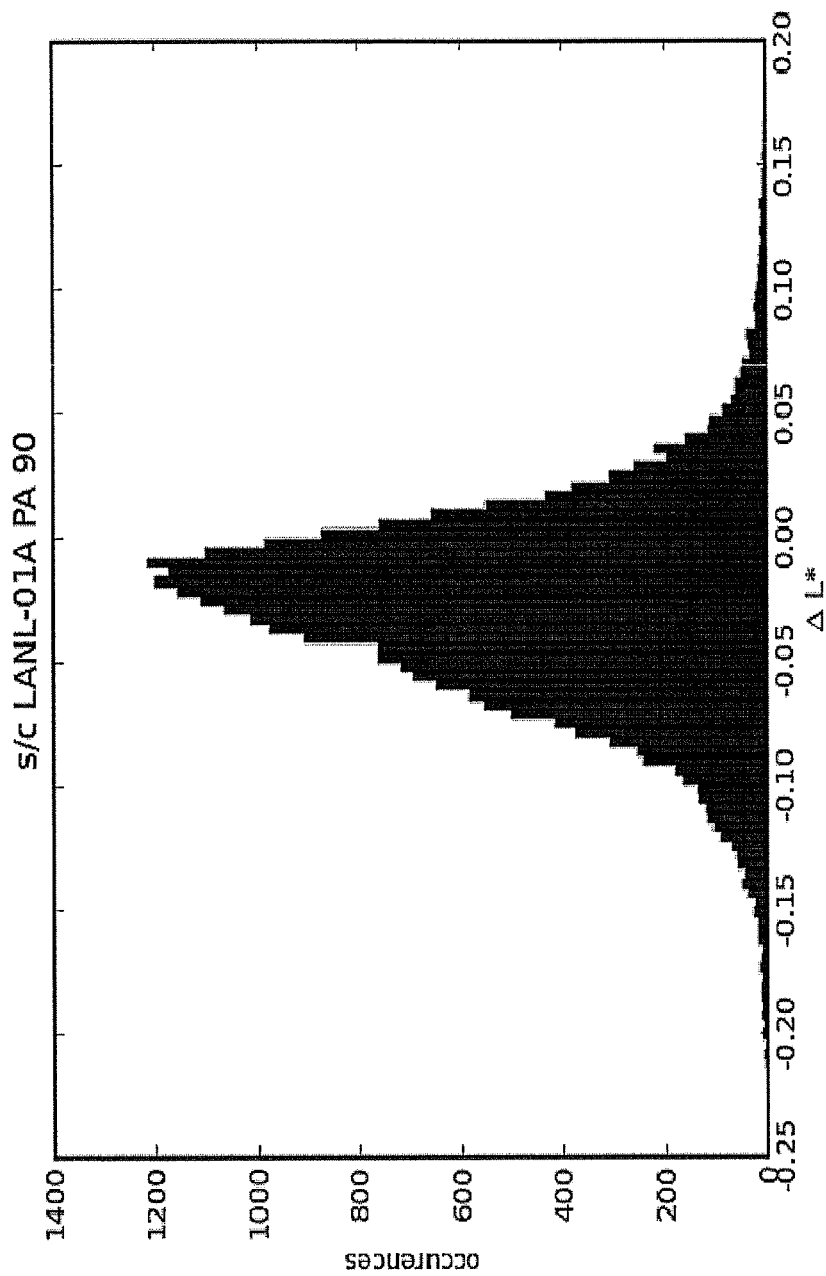
FIG. 5 is a histogram plot of the error of the trained neural network relative to the physics-based model in units of L*.

To show the size of the discrepancy between the neural net $L^*$ and the TSK03 $L^*$ the standard deviation error, referring to FIG. 4, is $\Delta L^*=0.038$. The median number of FIG. 4 is about $L^*=6.5$, meaning that the standard deviation is less than 1% of the average $L^*$ values. FIG. 4 is a scatter plot for the training sample compared to prediction from the neural network. FIG. 5 is a histogram of the error introduced by the neural network.

Having a trained and validated model, we can now proceed to use the model to calculate $L^*$ values for arbitrary geosynchronous satellites. The following steps can be used:

1. Obtain the required input parameters. In the exemplary embodiment here Kp, Dst, and solar wind density, velocity, pressure, By, Bz need to be obtained. This can be done from the omni2 data set or by some other means.
2. Obtain the coordinates of the spacecraft. In the preferred embodiment, the coordinates should be in the magnetic coordinate system (MAG), although other coordinate systems can also be used. The MAG coordinate system can be calculated with the ONERA-DESP library by calling the "coord_trans" subroutine.
3. Decide on a pitch angle ($\alpha$) between [10°, 90°]. The pitch angle is the angle between the velocity vector of a charged particle and the local magnetic field.
4. Query neural network NN-1 for the appropriate pitch angle to find out if this particular input+coordinate+$\alpha$ combination will lead to an open or closed drift shell (option 1) or determine Lmax (option 2).
5. If the results from NN-1 indicate a closed drift shell, query neural network NN-2 with the same input values to obtain the actual $L^*$ (using option 1). Or compare the previously calculated Lmax (using option 2) with the current $L^*$ value and choose $L^*$ only if $L^*<$Lmax. If necessary, interpolate between the $L^*$ for two neighboring pitch angles of existing neural networks.
6. Repeat the steps above as necessary for multiple $L^*$ values.

The obtained $L^*$ values if done repeatedly for a wide set of data for different periods in the solar cycle, different solar wind conditions and different locations in the magnetosphere can be useful for generating a model of the radiation belt environment for satellites under a wide variety of circumstances. Such a model can be useful for research purposes as well as practical applications. It should be noted that there is a time difference between the measurements of the solar wind, and the $L^*$ that results at a given location in the inner magnetosphere. Accordingly, this calculation of $L^*$ is predictive in the sense that the time of the solar wind measurements and the resultant $L^*$ are different. However, the neural network is encompassing this change in time.

While the above was done for geosynchronous orbits, the training coordinates can be increased to include other regions of the inner magnetosphere. One option is to simply increase the training torus and create many more training samples. This will take much longer than for just the geo-synchronous orbits locations. Another option is to use a field line tracing method to the magnetic equator and create a training data set from locations on the magnetic equator (FIG. 6). This is using the fact that the $L^*$ values are invariant along magnetic field lines. Before applying the neural network, the field line of the spacecraft location could first be traced to the magnetic equator and then used to obtain $L^*$ from the neural network. Overall this should only add a small additional compute time before the neural network can be applied. The $L\square$ value obtained at the magnetic equator will then be the same as for the actual spacecraft location above the equator.

Creating a future estimate of the space weather conditions affecting a satellite at a location uses an estimate of current conditions around the satellite as a starting point based on current flux measurements at the point of the satellite. In particular, the satellite can measure the flux of charged particles around it by collecting and measuring charged particles and by other techniques known to those of ordinary skill in the art. These measurements can be used in conjunction with a model of Earth magnetosphere conditions that depends on recent past measurements of solar wind conditions and earth-based magnetic measurements to understand the current magnetospheric conditions.

Making predictions requires the ability to take data that is noisy and/or sparse and use that data about evolving conditions in space in conjunction with a dynamic model of the Earth's magnetic field to make an estimate of future conditions of interest. This can be done with data assimilation methods, which assimilate the available data of the evolving conditions of the solar wind to a selected physics-based model.

Data assimilation proceeds by taking available data and proceeding in a series of steps. In each analysis step, observations of the state of solar wind and other parameters are reconciled with a radiation belt model of how the radiation belt evolves to produce an estimate of the state of the space weather. Future conditions (for a time-based model running in the forward direction) are considered to be an evolution from then-current conditions. Each analysis step tries to balance the uncertainty in the data and in the radiation belt model of how the space weather conditions evolve. The model is then advanced in time and its the prediction generated from the then-current becomes the "current" state in the next analysis cycle. Depending upon the character of the radiation belt model being used and the time-sequence of solar wind data available, evolving the model with a series of actual measurements can place the place predictions more precisely within the radiation belt model likely resulting in more accurate predictions if the model is a good one.

Kalman filtering is a particular method of data assimilation that is operative for the present invention. It is a recursive filter that can estimate the state of a dynamic system from a series of noisy measurements. Kalman filters are based on linear dynamical systems discretized in the time domain. They are modeled on a Markov chain built on linear operators perturbed by Gaussian noise. The state of the system is represented as a vector of real numbers.

Accordingly, model of the present state of affairs in the area of the satellite is stepped forward through time to achieve a prediction of a future state of affairs around the satellite.

The following steps can summarize how to make predictions of changing conditions, such as to aid the decision making regarding satellite operations using the most current solar wind data.

1. Obtain the current solar wind conditions;
2. Determine the space coordinates for the satellites used in (4), usually the location of the satellite inside the magnetosphere at the time that it will be influenced by the measured solar wind conditions;
3. Use solar wind conditions from obtained in step 1 to calculate $L^*$ with the neural network for the location identified by step 2;
4. Use the obtained $L^*$ value to convert currently observed fluxes at spacecraft into phase space density for forecast modeling;
5. Forecast the phase space density at a future satellite location using data assimilation methods and a radiation belt model, such as one that can be constructed as identified above;
6. Convert phase space density at the future time back into flux at the future time using the data from step 6; and
7. Use predicted flux for decision making (continue regular operation or put satellite into safe-mode).

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims. All of the references that follow are incorporated by reference as if set forth fully herein.

We claim:

1. A computerized method of accelerating calculation of $L^*$ in accordance with physics-based model of conditions in a magnetosphere comprising:

defining a surrogate model to be a surrogate for a physics-based model of $L^*$ for magnetic belts based on formula $L^* = (2\pi\mu_0)/(\Phi R_E)$ providing surrogate model computer instructions and surrogate model data;

training the surrogate model to be a surrogate for the physics-based model of $L^*$ for magnetic belts based on the formula $L^* = (2\pi\mu_0)/(\Phi R_E)$, wherein the physics-based model uses a plurality of physics-based model parameters, further comprising:

providing physics data based on the physics-based model parameters;

providing spatial data representing spatial coordinates for the location where $L^*$ is to be calculated;

providing surrogate models including sets of data for the physics-based model for each of a plurality of pitch angles;

selecting from the plurality of surrogate models at least one surrogate model set of data and instructions that calculate a closed drift shell for the physics-based model parameters and the spatial coordinates; and calculating $L^*$ by providing the physics-based model parameters and the spatial coordinates to the selected surrogate models that calculate a closed drift shell; and processing the trained surrogate model with a computer processor to accelerate the calculation of $L^*$ over a physics-based model.

2. The computerized method of claim 1, wherein the computer instructions and data comprise a feedforward neural network.

3. The computerized method of claim 1, wherein the physics-based model comprises the TSK03 model, a type of physics-based model for calculating $L^*$.

4. The computerized method of claim 1 wherein the surrogate model instructions are configured to provide:

a first plurality of input-layer units, there being at least one input-layer unit for each physics-based model parameter;

a second plurality of hidden layer units;

at least one output unit for the value of $L^*$;

a third plurality of first communication avenues, each first communication avenue connecting one of first plurality of input-layer units to one of the second plurality of hidden layer units, each communication avenue having a weighting value that represents the weight that the respective individual hidden layer unit gives to the respective input-layer unit; and a fourth plurality of second communication avenues, each second communication avenue connecting one of second plurality of hidden layer units to the output unit, each second communication avenue having a weighting value that represents the weight that the output unit gives to the respective hidden layer unit.

5. The computerized method of claim 4, wherein calculating $L^*$ comprises:

providing data values to each of the first plurality of input-layer units;

generating values for each of second plurality of hidden layer units, the values associated with each of the hidden-layer units being determined by the weights that the respective hidden layer unit gives to each of the input-layer units that it is connected to by a communication avenue; and generating a value of $L^*$ from the values generated for the second plurality of hidden layer units, the value of $L^*$ being determined by the weights that the output layer unit gives to each of the hidden-layer units that it is connected to by a communication line.

6. The computerized method of claim 1, adapted to predict an environment in the magnetosphere for a location at a second time later than a first time comprising:
calculating L* for the location at the first time using the surrogate model;
providing charge flux information for the location at the first time;
calculating a phase space density at the location at the first time from the value of L* at the location at the first time and the charge flux information for the location at the first time;
providing a radiation belt model;
forecasting the phase space density at the location at the second time using the radiation belt model and data assimilation methods;
calculating L* for the location at the second time using the surrogate model; and
converting the phase space density at the location at the second time into a value of charge flux using the value of L* for the location at the second time.

7. The computerized method of claim 6 adapted to operate a satellite, wherein the calculated phase space density at the second time is compared to a predetermined value of phase space density to decide about operating the satellite's protections against space weather.

8. A computerized method of accelerating calculation of L* in accordance with physics-based model of conditions in a magnetosphere comprising:
defining a surrogate model to be a surrogate for a physics-based model of L* for magnetic belts based on formula $L^*=(2\pi\mu_0)/(\Phi R_E)$;
providing surrogate model computer instructions and surrogate model data;
training the surrogate model to be a surrogate for the physics-based model of L* for magnetic belts based on the formula $L^*=(2\pi\mu_0)/(\Phi R_E)$;
processing the trained surrogate model with a computer processor to accelerate the calculation of L* over a physics-based model; and
predicting an environment in the magnetosphere for a location at a second time later than a first time comprising:
calculating L* for the location at the first time using the surrogate model;
providing charge flux information for the location at the first time;
calculating the phase space density at the location at the first time from the value of L* at the location at the first time and the charge flux information for the location at the first time;
providing a radiation belt model;
forecasting the phase space density at the location at the second time using the radiation belt model and data assimilation methods;
calculating L* for the location at the second time using the surrogate model; and
convert the phase space density at the location at the second time into a value of charge flux using the value of L* for the location at the second time,
wherein the calculated phase space density at the second time is compared to a predetermined value of phase space density to decide about operating a satellite's protections against space weather.

9. The computerized method of claim 8, wherein the computer instructions and data comprise a feedforward neural network.

10. The computerized method of claim 8, wherein the physics-based model comprises the TSK03 model, a type of physics-based model for calculating L*.

11. The computerized method of claim 8 wherein the physics-based model uses a plurality of physics-based model parameters, further comprising:
providing physics data based on the physics-based model parameters;
providing spatial data representing spatial coordinates for the location where L* is to be calculated;
providing surrogate models including sets of data for the physics-based model for each of a plurality of pitch angles;
selecting from the plurality of surrogate models at least one surrogate model set of data and instructions that calculate a closed drift shell for the physics-based model parameters and the spatial coordinates;
calculating L* by providing the physics-based model parameters and the spatial coordinates to the selected surrogate models that calculate a closed drift shell.

12. The computerized method of claim 8 wherein the surrogate model instructions are configured to provide:
a first plurality of input-layer units, there being at least one input-layer unit for each physics-based model parameter;
a second plurality of hidden layer units;
at least one output unit for the value of L*;
a third plurality of first communication avenues, each first communication avenue connecting one of first plurality of input-layer units to one of the second plurality of hidden layer units, each communication avenue having a weighting value that represents the weight that the respective individual hidden layer unit gives to the respective input-layer unit; and
a fourth plurality of second communication avenues, each second communication avenue connecting one of second plurality of hidden layer units to the output unit, each second communication avenue having a weighting value that represents the weight that the output unit gives to the respective hidden layer unit.

13. The computerized method of claim 12, wherein calculating L* comprises:
providing data values to each of the first plurality of input-layer units;
generating values for each of second plurality of hidden layer units, the values associated with each of the hidden-layer units being determined by the weights that the respective hidden layer unit gives to each of the input-layer units that it is connected to by a communication avenue; and
generating a value of L* from the values generated for the second plurality of hidden layer units, the value of L* being determined by the weights that the output layer unit gives to each of the hidden-layer units that it is connected to by a communication line.

* * * * *

UNITED STATES PATENT AND TRADEMARK OFFICE
CERTIFICATE OF CORRECTION

PATENT NO. : 8,428,916 B2  
APPLICATION NO. : 12/390611  
DATED : April 23, 2013  
INVENTOR(S) : Josef Koller Page 1 of 1

It is certified that error appears in the above-identified patent and that said Letters Patent is hereby corrected as shown below:

On the Title Page, Item (54) delete "MEGNETOSPHERE" and replace with --MAGNETOSPHERE--

Signed and Sealed this  
Fourth Day of June, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,428,916 B2  Page 1 of 1
APPLICATION NO. : 12/390611
DATED : April 23, 2013
INVENTOR(S) : Josef Koller It is certified that error appears in the above-identified patent and that said Letters Patent is hereby corrected as shown below:

On the Title Page, Item (54) and in the specification, Column 1, line 1, Title, delete "MEGNETOSPHERE" and replace with --MAGNETOSPHERE--

This certificate supersedes the Certificate of Correction issued June 4, 2013.

Signed and Sealed this
Second Day of July, 2013

Teresa Stanek Rea
*Acting Director of the United States Patent and Trademark Office*